(12) United States Patent
Kawamura et al.

(10) Patent No.: US 6,409,513 B1
(45) Date of Patent: Jun. 25, 2002

(54) METHOD FOR IMPROVING READING SPEED AND COMPREHENSION SKILLS

(75) Inventors: Akihiro Kawamura, Ooamishirasato-Machi (JP); Jeffrey C. Flamm, Salt Lake City, UT (US)

(73) Assignee: Infinite Mind, L.C., Salt Lake City, UT (US)

( * ) Notice: Subject to any disclaimer, the term of this patent is extended or adjusted under 35 U.S.C. 154(b) by 0 days.

(21) Appl. No.: 09/533,646

(22) Filed: Mar. 22, 2000

Related U.S. Application Data

(60) Provisional application No. 60/167,342, filed on Nov. 24, 1999.

(51) Int. Cl.[7] .......................... G09B 17/00; G09B 17/04
(52) U.S. Cl. ...................... 434/178; 434/179; 434/180
(58) Field of Search .............................. 434/178, 179, 434/180, 181, 182, 183, 184

(56) References Cited

U.S. PATENT DOCUMENTS

| | | | |
|---|---|---|---|
| 3,982,332 A | | 9/1976 | Szymczak |
| 4,078,319 A | | 3/1978 | Mazeski et al. |
| 5,147,205 A | | 9/1992 | Gross et al. |
| 5,498,002 A | * | 3/1996 | Gechter ...................... 273/434 |
| 5,592,143 A | * | 1/1997 | Romney et al. ........ 340/309.15 |
| 5,980,264 A | * | 11/1999 | Lundberg ................... 434/322 |
| 6,130,968 A | * | 10/2000 | McIan et al. ............... 382/309 |

OTHER PUBLICATIONS

Munson et al., "Lightning–Speed Read", Aug. 1995, Prevention, vol. 47 Issue 8, p25.*
Keillor, "A Quick Read", Jun. 1995, Minneapolis–St. Paul CityBusiness, vol. 13 Issue 4, p9.*
A Quick Read. Learning Strategies Corp.; Speed Reading. Minneapolis–St. Paul CityBusiness, Jun. 30, 1995, vol. 13 Issue 4, p9, 1/8p. Author: Keillor, Lynn.
Lightning–speed Read. Vision; Aged—Health & Hygiene. Prevention, Aug. 95, vol. 47 Issue 8, p25, 2p, 1c. Authors: Munson, Martin; Yeykal, Teresa.

* cited by examiner

*Primary Examiner*—John Edmund Rovnak
(74) *Attorney, Agent, or Firm*—Morriss, Bateman, O'Bryant & Compagni

(57) ABSTRACT

A system which utilizes a series of computer controlled exercises designed to strengthen eye muscles to reduce eye fatigue, to increase overall reading speed by performing variable reading speed exercises, and to enhance an eye-brain connection to improve reading comprehension and maintain the speed reading and comprehension skills. A specific variable reading rate process has the reader read at a first rate, then increase to a second rate, and finally decrease to a third reading rate that is faster than the first rate, and slower than the second rate. Eye-brain connection enhancement exercises include following objects moving in specific patterns across a computer screen, expanding peripheral vision by watching and following the outline of expanding objects, rapidly solving maze puzzles, sequentially locating a series of numbers on a single display screen, and two-point horizontal and vertical scanning.

30 Claims, 21 Drawing Sheets

Reading Speed Test

| Time: | Words per Minute: |

Once upon a time in a small village near a large forest, a mother lived in a cottage with her young daughter. The girl was very pretty and was the nicest girl in the entire village. Everyone loved her. But no one loved her more than her grandmother, who lived in her own cottage on the other side of the forest.
Grandmother loved the girl so much that she made her a red cape with a hood for a birthday present. The little girl loved the red cape and wore it almost every day. Soon everyone in the village began calling her Little Red Riding Hood, because she wore it all the time.
One morning Little Red Riding Hood's mother called her into the kitchen. "I've gotten news that your grandmother isn't feeling well," her mother said.

Press spacebar to stop

Stop

*Fig. 4*

Reading Practice
READ AT YOUR OWN PACE

COLUMN WIDTH
(Words Per Line)
8=Newspaper
14=Book
[ 14 ▼ ]

FONT SIZE
(Size of Words)
[ 10 ▼ ]

BEN-HUR A TALE OF THE CHRIST
by Lew Wallace

CHAPTER 1
INTO THE DESERT

THE Jebel es Zubleh is a mountain fifty miles and more in length, and so narrow that its tracery on the map gives it a likeness to a caterpillar crawling from the south to the north. Standing on its red-and-white cliffs, and looking off under the path of the rising sun, one sees only the Desert of Arabia, where the east winds, so hateful to the vine-growers of Jericho, have kept their playgrounds since the beginning. Its feet are well covered by sands tossed from the Euphrates, there to lie, for the mountain is a wall to the pasture-lands of Moab and Ammon on the west-lands which else had been of the desert a part.

The Arab has impressed his language upon everything south and east of Judea, so, in his tongue, the old Jebel is the parent of numberless wadies which, intersecting the Roman road-now a dim suggestion of what once it was, a dusty path for Syrian pilgrims to and from Mecca-run their furrows, deepening as they go, to pass the torrents of the rainy season into the Jordan, or their last receptacle, the Dead Sea. Out of one of these wadies-or, more particularly, out of that one which rises at the extreme end of the Jebel, and, extending east of north, becomes at length the bed of the Jabbok river-a traveller passed, going to the tablelands of the desert. To this person the attention of the reader is first besought.

Judged by his appearance, he was quite forty-five years old. His beard, once of the deepest black, flowing broadly over his breast, was streaked with white. His face was brown as a parched coffee-berry, and so hidden by a red kufiyeh (as the kerchief of the head is at this day called by the children of the desert) as to be but in part visible. Now and then he raised his eyes, and they were large and dark. He was clad in the flowing garments so universal in the East, but their style may not be described more particularly, for he sat under a miniature tent, and rode a great white dromedary.

It may be doubted if the people of the West ever overcome the impression made upon them by the first view of a camel equipped and loaded for the desert. Custom, so fatal to other novelties, affects this feeling but little. At the end of long journeys with caravans, after years of residence with the Bedawin, the Western-born, wherever they may be, will stop and wait the passing of the stately brute. The charm is not in the figure, which not even love can make beautiful, nor in the movement, the noiseless stepping, or the broad careen. As is the kindness of the sea to a ship, so is that of the desert to its creature. It clothes him with all its mysteries, in such manner, too, that while we are looking at him we are thinking of them: therein is the wonder. The animal which now came out of the wady might well have claimed the customary homage. Its colour and height; its breadth of foot; its bulk

[ Exit ]
[ Start Timer ]

*Fig. 13*

AcceleREAD - Adult

| Resource Center | SESSIONS 1 2 3 4 5 6 7 8 9 10 11 12 | Testing Center | Reading Practice | Personal Training |

INSTRUCTIONS

These exercises will strengthen all six sets of eye muscles and increase your field of vision.

MOVING OBJECTS
Follow the moving objects with your eyes without moving your head.

EXPANDING CIRCLES & SQUARES
Look in the center of the circles or squares and follow the expanding edges with your peripheral vision.

CAUTION
Your eyes, like any other muscle group, need warm-up and regular exercise. If your eyes feel fatigue or pain, discontinue the exercise for 2 or 3 days. If the pain persists it may be symptomatic of an underlying eye problem. Consult your eye physician.

Eye Exercises

Begin with the 30 second exercise. As your eyes become stronger, increase the exercise time.

▲ 30 Seconds

▲ 60 Seconds

▲ 90 Seconds

[ Close ]

*Fig. 15*

AcceleREAD - Adult

File  Help

Resource Center | SESSIONS 1 2 3 4 5 6 7 8 9 10 11 12 | Testing Center | Reading Practice | Personal Training

INSTRUCTIONS

Solving mazes activates the right brain and strengthens your ability to scan images quickly.

Practice Mazes
When solving a maze, push yourself and solve it as quickly as possible. The maze numbers correspond to the session numbers and become increasingly difficult.

Test Mazes
Every few sessions, test yourself again to see how much your ability to visually scan has improved.

Maze Games

▲ Test Your Speed

▲ Practice At Level
   1 2 3 4 5 6 7
   8 9 10 11 12

▲ Progress Chart

[ Close ]

AcceleREAD - Adult

File  Help

| Resource Center | SESSIONS 1 2 3 4 5 6 7 8 9 10 11 12 | Testing Center | Reading Practice | Personal Training |

INSTRUCTIONS

This exercise will teach you to move your eyes quickly and is highly effective for increasing reading speed.

SCAN THE SQUARES
Each line of words begins and ends with a square. Move your eyes quickly from the left square to the right square. Then repeat with the next line. Do NOT read the words---only look at the squares. The goal is for you to scan as many lines as possible in 10 seconds by looking at the squares.

SCAN THE WORDS
After your two-point training practice, see how much of the text you can actually read in ten seconds.

Two-Point Training

IMPORTANT NOTE:
This exercise has proven to be one of the most effective tools to increase your reading speed. However, this two-point training exercise may be strenuous on the eyes and should not be practiced more frequently than every other day.

▶ Start Training

[ Close ]

*Fig. 20*

Two-Point Training

| # | Text | # | |
|---|---|---|---|
| 21 | ■ stared on as some suggested, a swift Italian poison administered in a cup of | ■ 21 | |
| 22 | ■ spiced wine slow within an hour of her poisoning the white girl who had given | ■ 22 | |
| 23 | ■ him birth and as the trusty messenger who bore the child across the saddle-bow | ■ 23 | |
| 24 | ■ stooped from his weary horse and knocked at the rude door of the goatherd's hut, | ■ 24 | |
| 25 | ■ the body of the Princess was being lowered into an open grave that had been dug | ■ 25 | |
| 26 | ■ in a deserted churchyard, beyond the city gates, a grave where, it was said, that | ■ 26 | |
| 27 | ■ another body was also lying -- that of a young man of marvelous and foreign | ■ 27 | |
| 28 | ■ beauty whose hands were tied behind him with a knotted cord, and whose breast | ■ 28 | |
| 29 | ■ was stabbed with many red wounds. Such was the story that men whispered to | ■ 29 | |
| 30 | ■ each other. Certain it was that the old King, when on his death-bed, whether | ■ 30 | |
| 31 | ■ moved by remorse for his great sin or merely desiring that the kingdom should | ■ 31 | |
| 32 | ■ not pass away from his line, had had the lad sent far, and, in the presence of the | ■ 32 | |
| 33 | ■ Council, had acknowledged him as his heir. And it seems that from the very first | ■ 33 | |
| 34 | ■ moment of his recognition he had shown signs of that strange passion for beauty | ■ 34 | |
| 35 | ■ that was destined to have so great an influence over his life. Those who | ■ 35 | |
| 36 | ■ accompanied him to the suite of rooms set apart for his service, often spoke at the | ■ 36 | |
| 37 | ■ cry of pleasure that broke from his lips when he saw the delicate raiment and rich | ■ 37 | |
| 38 | ■ jewels that had been prepared for him, and of the almost fierce joy with which he | ■ 38 | |
| 39 | ■ flung aside his rough leather tunic and coarse sheepskin cloak. He missed the | ■ 39 | |
| 40 | ■ fine freedom of his forest life, and was always apt to chafe at the tedious Court | ■ 40 | |

How far did you get?

1-10 Lines:
You didn't follow the instructions. You read the words instead of looking at the squares.

10-19 Lines:
You probably read some of the words and that slowed you down.

20-29 Lines:
You followed the instructions but you concentrated too much on moving your eyes in straight lines and that slowed you down.

30-39 Lines:
Your eye muscles aren't strong enough yet or you would have finished.

40 Lines:
Outstanding!
Now try reading the words at the same pace.

[Practice Again] [Close]

*Fig. 21*

Comprehension Test

QUESTION 1:

The story states that popcorn is more than just a snack because:

Select an Answer:

☐ It is high in fiber.

☐ We remember movies we have seen when we eat it.

☐ We associate popcorn with happy memories from childhood.

☐ The popcorn industry is booming.

[Next]    Press spacebar to continue    [Close]

*Fig. 22*

METHOD FOR IMPROVING READING SPEED AND COMPREHENSION SKILLS

This application claims priority from Provisional application Ser. No. 60/167,342, filed Nov. 24, 1999.

BACKGROUND

1. The Field of the Invention

This invention relates generally to a method for improving reading speed and comprehension skills through a series of exercises. Specifically, the invention teaches a series of computer controlled exercises designed to strengthen eye muscles, to reduce eye fatigue, to increase overall reading speed by performing variable reading speed exercises, and to enhance an eye-brain connection to improve reading comprehension and maintain the speed reading and comprehension skills.

2. The State of the Art

The state of the art is replete with various methods and techniques which claim to teach a method of exercises or techniques that can be used to improve a person's reading speed and reading comprehension. These exercises and techniques are generally taught as a live course, in a book, or as a course recorded as audio, video, or as a computer-based application.

For example, in U.S. Pat. No. 3,982,332, Szymczak teaches a hand manipulated packet containing a series of removable opaque cards. The cards contain slots through which text is read. The cards are arranged to provide successively wider viewing areas. The cards are used to read columns of words which are made wider and wider so as to correspond to the card with a matching viewing area. The exercise described therein is intended to increase an area of perception.

Similarly, U.S. Pat. No. 4,078,319 issued to Mazeski et al. teaches a different device and method for increasing a lateral span of view. A first optical lens is used to reduce the image of a line of words. After practicing at the first magnification, optical lenses of successively lesser magnification are used.

Speed reading exercises and techniques are also taught using software on a computer. A computerized tachistoscope is taught in U.S. Pat. No. 5,147,205 issued to Gross et al. Gross apparently teaches a system whereby groups of three words are flashed for a short time on a computer screen. A rate at which the words appear on the screen is intermittently increased in jumps of approximately 10%.

The prior art teaches that in order to increase a rate of reading, it is useful to expand a person's area of perception. As demonstrated by the cited prior art, many different techniques have been developed to achieve this goal.

It would be an advantage over the prior art to teach a new method of expanding an area of perception which can take more advantage of the abilities of a computer system to display graphical information.

The prior art also fails to recognize that there is an advantage in trying to involve both hemispheres of the brain into the reading process. Reading is generally recognized as a left-brain process. By involving the right and left hemispheres of the brain simultaneously, both reading speed and comprehension can be improved. This will be accomplished by teaching eye-brain connectivity exercises.

The prior art also fails to recognize the advantages that can be gained by providing a series of exercises that are designed to maintain and ensure retention of skills that are learned from a speed reading program. Therefore, it would also be an advantage to teach a series of repeatable exercises.

The prior art also fails to teach the advantages of exercising a majority of the muscles of the eye. By strengthening eye muscle groups, the eye is less likely to suffer from fatigue, which can affect reading speed and comprehension.

It is observed that the prior art teaches methods of increasing reading speed. However, the prior art only teaches methods which ask the reader to simply read faster. Thus, the prior art fails to recognize the advantages of both increasing and subsequently decreasing a reading rate to accomplish an overall increase in reading rate.

The prior art also teaches the disadvantages of sub-vocalization. Sub-vocalization is the tendency of people to silently say individual words to themselves as they read. This action slows the reading process. However, it would be an advantage to teach a new method of increasing reading speed and reading comprehension which also tends to eliminate the habit of sub-vocalizing.

OBJECTS AND SUMMARY OF THE INVENTION

It is an object of the present invention to provide a software program which uses interactive teaching methods to improve reading comprehension and reading speed through a series of eye exercises and a specific regimen of reading rate variance.

It is another object of the invention to teach eye exercises which strengthen a variety of eye muscles to thereby reduce eye fatigue which can adversely affect reading rates and reading comprehension.

It is another object of the invention to teach eye exercises which specifically enhance eye-brain connectivity to thereby involve both hemispheres of the brain in the reading process.

It is another object to teach exercises which enhance eye-brain connectivity to thereby improve the ability to simultaneously read multiple words.

It is another object to teach a system of increased reading speed and improved reading comprehension which teaches a specific stimulus to prime the eyes and the mind to thereby awaken rapid reading pattern skills.

It is another-object to teach a method to improve reading speed which requires the reader to alter the speed at which exercises are read, where the speed required of the reader is altered in a specific manner to improve a base reading rate of the reader.

It is another object to teach a method to improve reading speed which requires the reader to read at a first speed, to then increase reading to a second speed which is much faster than the reader can presently read, and then to decrease reading to a third speed which is between the first speed and the second speed, thereby pushing the brain to a new reading level.

The present invention is embodied in a system which utilizes a series of computer controlled exercises designed to strengthen eye muscles to reduce eye fatigue, to increase overall reading speed by performing variable reading speed exercises, and to enhance an eye-brain connection to improve reading comprehension and maintain the speed reading and comprehension skills.

In a first aspect of the invention, a specific variable reading rate process has the reader read at a first rate, then increase to a second rate, and finally decrease to a third reading rate that is faster than the first rate, and slower than the second rate.

In a second aspect of the invention, eye-brain connection enhancement exercises are provided and which include following objects moving in specific patterns across a computer screen, expanding peripheral vision by watching and following the outline of expanding objects, rapidly solving maze puzzles, sequentially locating a series of numbers on a single display screen, and 2-point horizontal and vertical scanning.

In a third aspect of the invention, these exercises have been adapted to work in a computer screen saver application which, when engaged, will pop up on a computer display whenever the screen saver is activated. This feature enables users to maintain and improve the eye muscles, and also activates the rapid reading pattern that the reader has learned in the training sessions.

These and other objects, features, advantages and alternative aspects of the present invention will become apparent to those skilled in the art from a consideration of the following detailed description taken in combination with the accompanying drawings.

BRIEF DESCRIPTION OF THE DRAWINGS

FIG. 4 is a screen shot which shows what is displayed when a Pre-test or Post-test is selected from a Session page such as shown in FIG. 3.

FIG. 13 is a screen shot of the appearance of a sample reading page which the reader is asked to reader while being timed.

FIG. 15 is a screen shot that shows the screen that is displayed when the reader selects Eye Exercises 64 from the screen shown in FIG. 14.

FIG. 16 is a screen shot that shows the screen that is displayed when the reader selects Maze Games 66 from the screen shown in FIG. 14.

FIG. 18 is a screen shot that shows the screen that is displayed when the reader selects Number Find Games 68 from the screen shown in FIG. 14.

FIG. 20 is a screen shot that shows the screen that is displayed when the reader selects Two-Point Training 70 from the screen shown in FIG. 14.

FIG. 21 is a screen shot of a two-point training session.

FIG. 22 is a screen shot that shows the screen that is displayed when the reader selects Comprehension Test 72 from the screen shown in FIG. 14.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The present invention is essentially a new method for improving a person's reading rate, comprehension, and retention of information. It is important to note that the present invention is implemented on a computer system because the exercises and techniques have been specifically integrated with it to thereby take advantage of the abilities of a computer. It should also be remembered that the present invention to be described hereinafter is the presently preferred embodiment. Accordingly, the claims of the invention are intended to cover modifications to the specific implementation which will now be described.

The present invention has been implemented as a computer software program that is presently called AcceleREAD (™). The figures of the present invention are generally going to be screen shots taken from that program. However, the specific screen shots are provided only as examples, and should not be considered limiting of specific claims. AcceleREAD is presently written to run in the WINDOWS 95(™), WINDOWS 98(™), WINDOWS NT, and WINDOWS 2000(™) Operating Systems. Accordingly, navigation through the program is accomplished with a mouse, trackball, touchpad or similar cursor manipulation device. However, it should be remembered that the program can be adapted to run in any desired operating system which can display graphics. The program also requires that the computer system have speakers so that audible ticking sounds can be heard during training exercises.

The novel aspects of the invention are going to be described in detail as part of a walk-through of the AcceleREAD program. This should make it easier to identify the novel aspects of the invention, and to understand how the novel aspects are related to each other as taught by the present invention.

Figure 1:
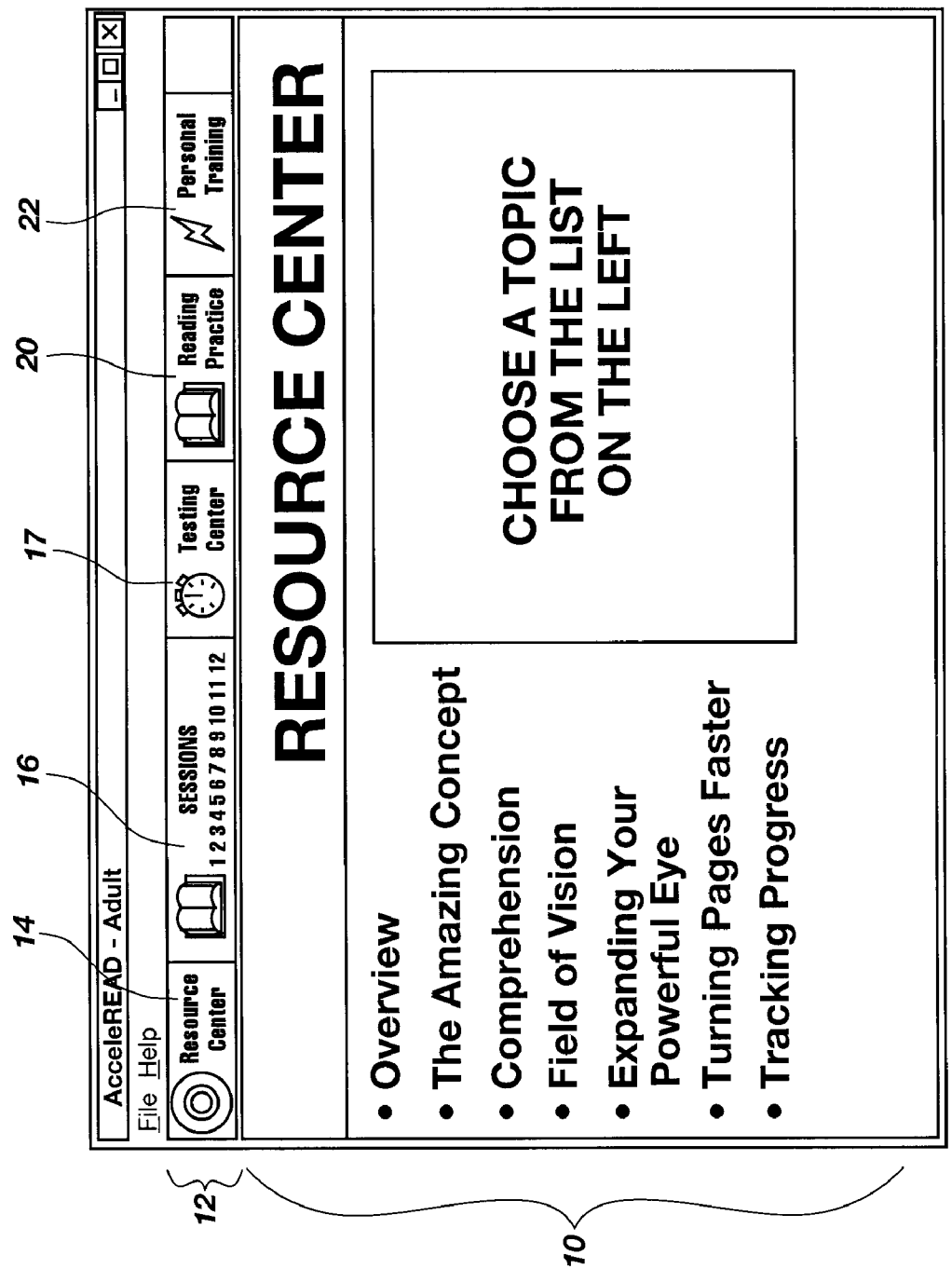
FIG. 1 is a screen shot of the Resource Center as utilized in the presently preferred embodiment of the computer software program.

FIG. 1 is a screen shot of the program AcceleREAD(™) which shows a work area 10 and a menu bar 12. The menu bar 12 shows that the program functions that are selectable are the Resource Center 14, Sessions 16, the Testing Center 18, Reading Practice 20, and Personal Training 22. In this figure, the Resource Center 14 has been selected, and its options are displayed in the work area 10.

The selectable options in the Resource Center 14 are an Overview 24, The Amazing Concept 26, Comprehension 28, Field of Vision 30, Expanding Your Powerful Eye 32, Turning Pages Faster 34, and Tracking Progress 36.

It is explained in these sections 24, 26, 28, 30, 32, 34 and 36, that some of the concepts of the present invention were being developed by Dr. Akihiro Kawamura in the 1980s. However, the novel concepts of the present invention have only now been fully developed and implemented in computer software. In fact, implementation on a computer system is what makes it possible to use all of the concepts of the present invention.

It is noted that the present invention was developed as a method of removing barriers to processing information. To do this, six sets of eye muscles are strengthened. Test results show that most people find that their reading speed will double or triple after the first few sessions. By the time a person has completed the course, a 2 to 10 times increase in reading speed is common.

Comprehension is also an important feature of the present invention. Just reading faster does not usually improve your comprehension. However, studies have shown that comprehension can increase when you read the same material several times. Accordingly, a reading technique taught by the present invention is to combine the eye exercises and with a reading pattern. The reader is taught to first preview the material by scanning it quickly to establish the framework in the reader's brain. Then, the reader is taught to read the material again but more slowly for comprehension. Then, the reader is taught to read the material again quickly to reinforce knowledge of the concepts. Because the reader is taught how to read faster, the steps of Preview, Read, and Review can typically be accomplished in less time than the reader would normally read the material once before using the techniques of the invention.

Expanding the reader's field of vision is another important aspect of the invention. This concept is well known in the prior art. However, the exercises taught in the present invention are unique. Along with the exercises in the computer program, the reader is encouraged to practice looking straight ahead when walking down the street. While walking, the reader should try to peripherally "see" things, rather than shifting the eyes or head from side to side.

It has been the experience of readers that once they begin to read faster, it can be more difficult to turn pages fast enough. The present invention includes an exercise which not only helps a reader turn pages faster, but is also used as a trigger mechanism for the brain to stimulate the rapid reading patterns learned from the present invention.

The reader is taught to hold a book in a first hand and to grip it snugly. Then, the reader is to grip the pages firmly between the thumb and index finger of the other hand. Instead of slipping the pages with the hand, the reader is taught to slowly rotate the first hand that is holding the book, and to watch the pages turn smoothly and accurately. Therefore, the technique is to rotate the first hand holding the book, and not to flip the pages with your thumb.

The reader is encouraged to track progress while learning the techniques of the present invention by taking reading tests before each session and again after completing each session. The test results are recorded by the program so that the reader can review the progress in the Resource Center 14.

The core of the present invention is comprised of the Sessions 16 shown on the menu bar 12. The twelve training sessions are a fast-paced and entertaining way to learn the novel speed reading techniques. Each session lasts approximately 7 minutes. In order to maximize the learning during each session, it is suggested that distractions be minimized, that the reader relax, and focus attention on the computer screen. For best results, the reader should choose a relatively quiet time each day when the reader is well-rested and able to concentrate.

Figure 2:
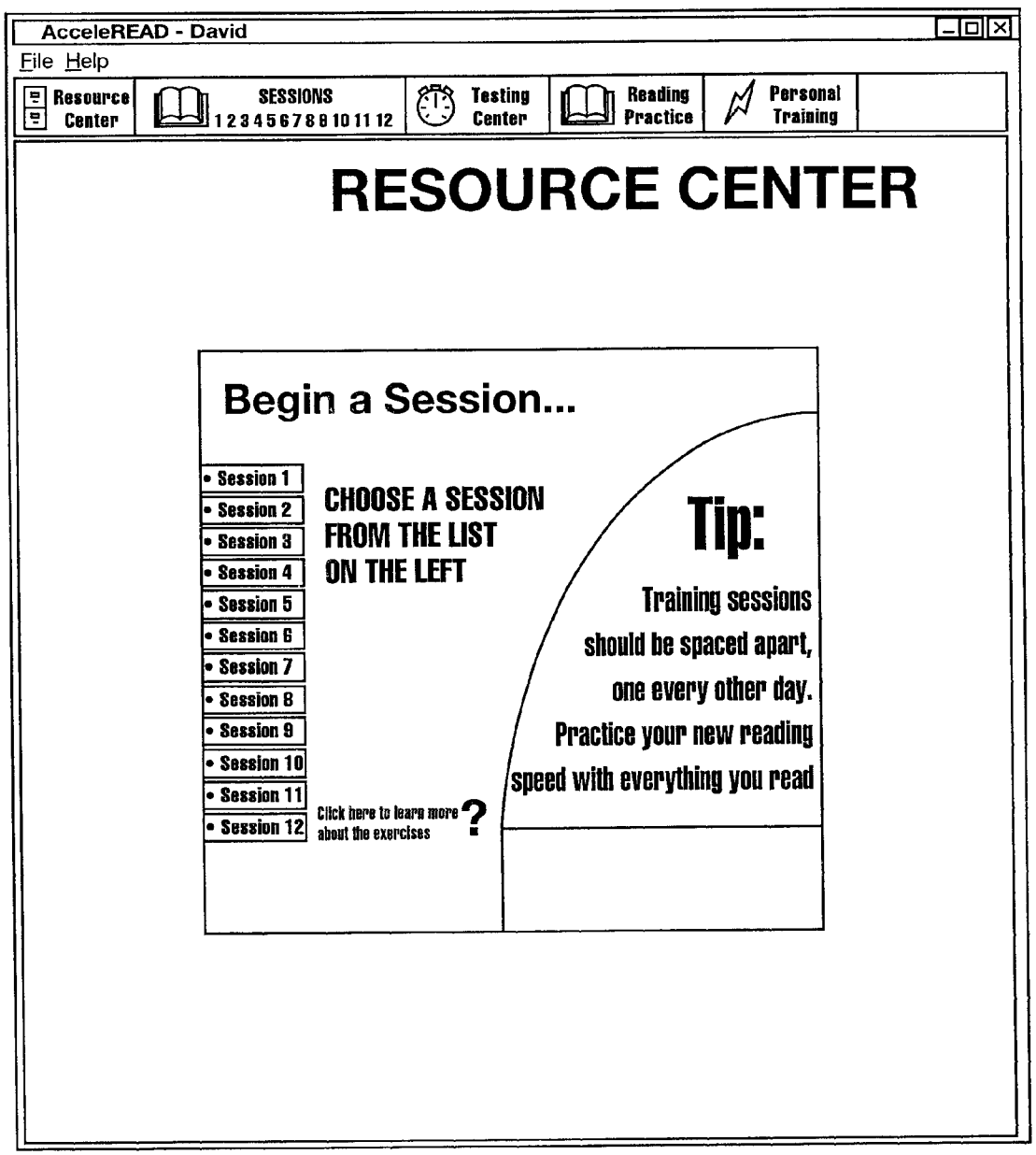
FIG. 2 is a screen shot which shows all of the sessions that can be selected when Sessions are selected from the Resource Center screen of FIG. 1.

When the reader selects SESSIONS 16 from the menu bar 12, the reader is given a menu 40 from which the reader selects which session to take. FIG. 2 is a screen shot which shows all of the sessions that can be selected. Included on this page is a suggestion to the reader that training sessions be spaced apart, one session every other day. There are a total of 12 sessions in the present invention. As explained earlier, each session takes approximately 7 minutes each. Each session may vary slightly from the other sessions, with changes added to each session to make it a little more challenging than the last.

Figure 3:
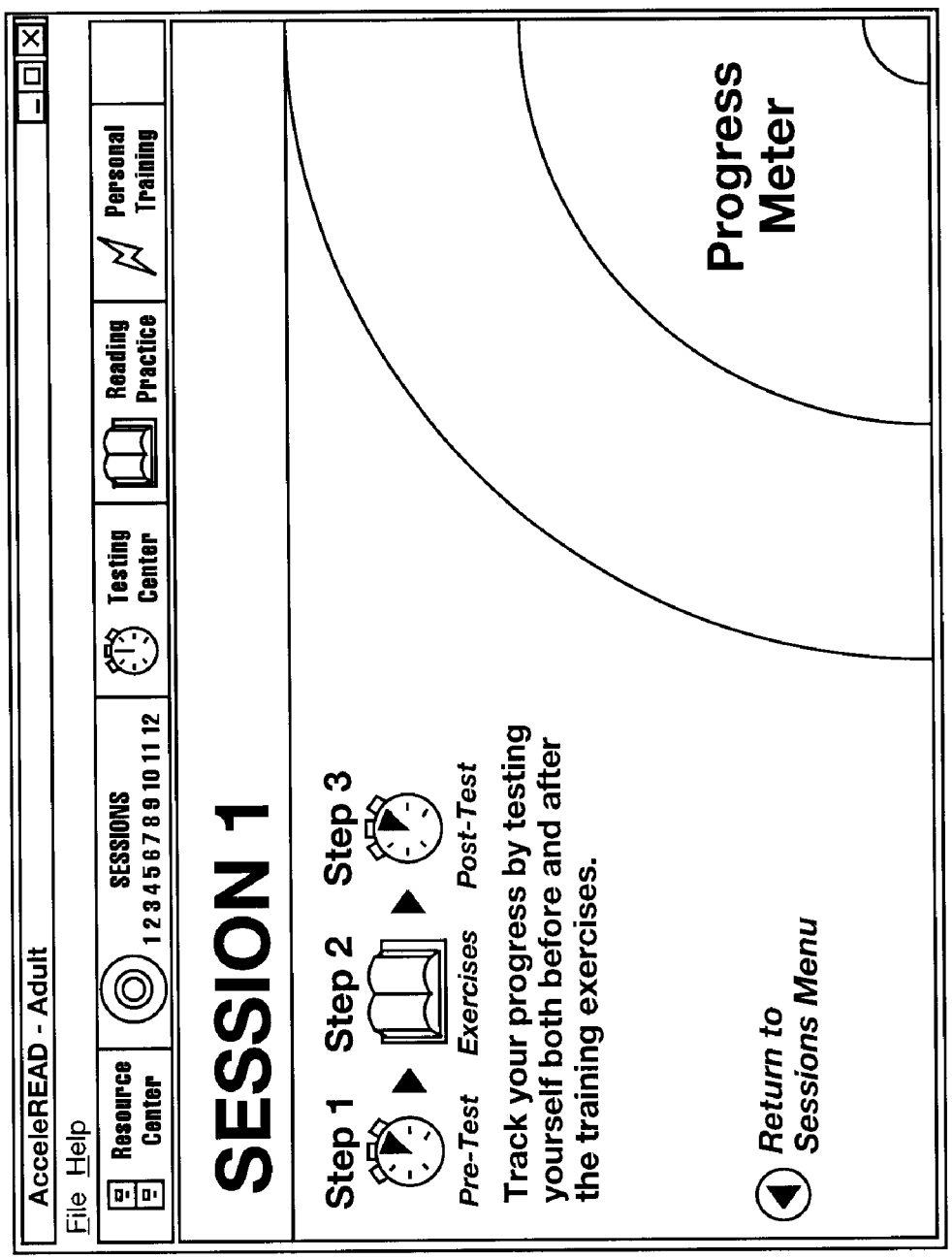
FIG. 3 is a screen shot which shows what is displayed if the reader selects Session 1 from the Sessions screen shot of FIG. 2.

When the reader begins the first training session, the software program paces the reader through a pre-testing exercise, a training session, and a post-training exercise. FIG. 3 is provided as a screen shot of what is displayed on the computer screen when session 1 is selected from the menu 40 (FIG. 2). Although the reader can go straight to Step 1, Step 2 or Step 3, the reader should take the Pre-Test of Step 1 first, then do the exercises of Step 2, and then take the Post-Test in Step 3 to see how much progress was made. At the end of the session, all of the Pre and Post tests that the reader has previously taken are shown in chronological order in a graph. The reader is thus able to quickly quantify progress.

FIG. 4 is a sample of a Pre or Post-Test. Because each test measures both time expended and words read, the results of each Pre and Post-Test can be meaningfully compared to each other. The Pre or Post-Test initially shows a blank space in area 42. The instructions at the bottom of the test request the reader to either press the spacebar to start, or to move the cursor to a start button and click it. When the spacebar or start button are actuated, a paragraph appears in area 42 as shown in FIG. 4. The reader is to read the paragraph as fast as possible, while still being able to understand and comprehend its meaning. The reader is instructed to press the spacebar or click on a stop button to stop a timer. The time in seconds and the corresponding number of words per minute are then displayed at the top of the screen in area 44. The reader does not have to remember the score because the program has recorded it. The reader then clicks on a close button to return to the session page shown in FIG. 3.

The reader should remember that when doing the training exercises of Step 2, the reader should press the spacebar or click on the icon labeled PAUSE if fatigue or pain is felt at any time during a training session. After feeling rested, the reader can resume the session by pressing the spacebar or clicking on the RESUME button. Any session can also be ended at any time by clicking on the icon labeled CLOSE.

One feature that the reader will notice during the eye-brain training exercises of Step 2 is a rhythmic ticking sound, much like a metronome used to practice musical instruments. The ticking sound is synchronized to match the movement of characters, objects or words on the screen. Research has shown that repetition, including sound repetition, improves the learning process by conditioning the eyes to move quickly and rhythmically. The sound also conditions the reader to read at a steady pace.

When doing the reading exercises, the reader can also check to see the reading speed of the current exercise by looking in the lower right hand corner of the computer screen. The lower left-hand corner contains red circles that become red dots when a step in a training session is completed. This indicates to the reader how much of a given session is remaining at any point in time.

When the reader selects Step 2 as show in FIG. 3, the training exercises begin. There are about ten different exercises in each session of the presently preferred embodiment. However, this number can be modified as desired. Each exercises is preceded by a short explanation to the reader explaining what the reader is supposed to do. The instructions are displayed for a total of approximately 8 seconds each, with a countdown counter displayed next to the instructions so that the reader knows exactly when the exercise will begin.

Before describing each exercise, it is noted that the specific order of the exercises can be modified. In other words, it is the nature of the exercises themselves, and not their order that is novel. Furthermore, more than 10 exercises can be included in each training session. However, the length and the number of the exercises were simply selected as a convenient quantity which experimentation has shown is most beneficial to the training of many readers.

The training sessions do not provide specific exercises in the exact same order. Accordingly, the example to be given is only one particular sequence of exercises. Specifically, the sequence to be described is used in Session 1 of the program. Therefore, the specific sequence should not be considered a limiting factor of the claims.

In the first exercise, the reader is requested to follow an object on the computer screen with the eyes. The reader is not to move his/her head. The object is typically a relatively small graphical image such as a tennis ball or basketball which moves in a predetermined motion. For example, the motion can be horizontal, vertical and then diagonal as in the preferred embodiment, or other motion such as circular. Alternatively, the motion can also be reversed after any number of complete circuits or revolutions of the predetermined path. It should be remembered that these exercises are relatively quick, each lasting approximately 8 to 12 seconds. As an example of an alternative embodiment, the object in the first exercise might move in four circles, two in one direction, then two in another, in approximately 11 seconds.

If the reader does not pause the program, the training exercise displays the instructions for the second exercise after the first exercise is completed. As explained before, a countdown timer indicates how much time is remaining until the next exercise begins.

A second exercise instructs the reader to watch the expanding perimeter of an object as it grows larger and larger. For example, a small outline of a square appears in the center of the computer screen. The outline disappears and is then quickly redrawn slightly larger. This process repeats itself until the edges of the object have generally reached the edges of the computer display. In a typical sequence, a square is redrawn approximately 16 times in 6 seconds as it first appears on the screen and is redrawn until it reaches the outer edges of the display. The purpose of this exercise is to train the reader to expand peripheral vision, so that the reader sees more during any one glance at a page of words.

Figure 5:
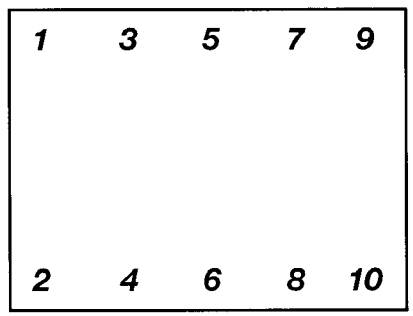
FIG. 5 is a diagram of positions on a computer display at which an object will appear and that the reader is to follow when the reader performs eye exercises.

A third exercise instructs the reader to quickly move the eyes to follow an object which is rapidly being made to appear and disappear from the corners of the computer screen. The object is first made to appear in the sequence shown in FIG. 5. Remember that the positions can be modified. The purpose of the exercise is to train the eyes to scan rapidly horizontally and vertically.

Figure 6:
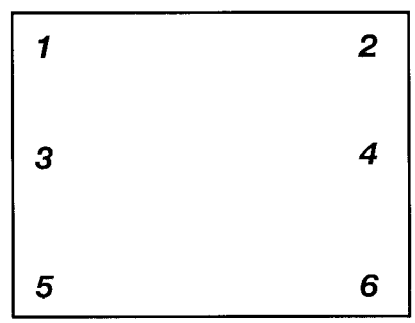
FIG. 6 is a diagram of positions on a computer display at which an object will appear and that the reader is to follow when the reader performs eye exercises.

The object appears at position 1, then 2, then 3, etc. until reaching position 10. Then the sequence reverses itself, and the position moves back through position 9, then 8, etc. until reaching position 1. The total number of positions can be modified. The object then begins to move and appear in the sequence of positions shown in FIG. 6. After the end of sequence is completed, the object then moves backwards sequentially until reaching the first position.

Figure 7:
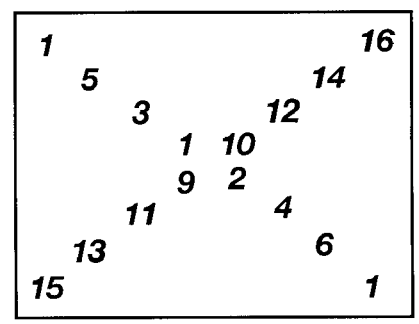
FIG. 7 is a diagram of positions on a computer display at which an object will appear and that the reader is to follow when the reader performs eye exercises.

A fourth exercise is similar to the third exercise, except that instead of moving horizontally and vertically, the object appears and disappears in a diagonal motion. This concept is illustrated in FIG. 7. FIG. 7 shows that the object first appears near the center of the computer screen at position 1. The object moves further outwards until reaching position 8, after which it moves back near the center of the computer screen from where it begins to move outwards again. The object jumps outwards until reaching position 16.

Figure 8:
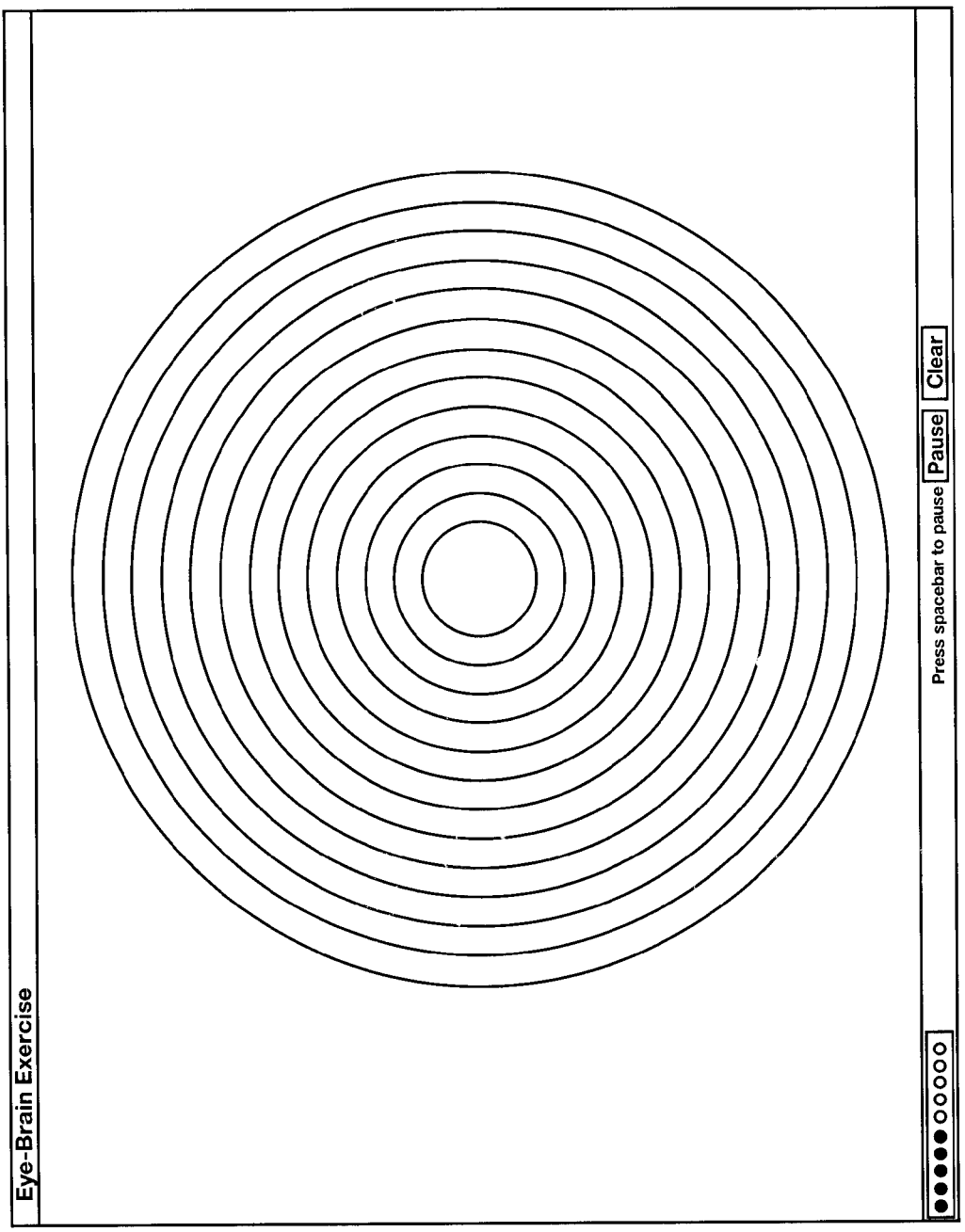
FIG. 8 is a screen shot that shows an object that is being drawn larger and larger until the perimeter of the object reaches the edges of the computer display, and where the object is not erased before a next larger outline is drawn.

The fifth exercise is similar to the second exercise in that the outline of an object first appears in the center of a screen. However, instead of erasing the outline before drawing the next larger version, the outlines are all left intact on the computer screen. The reader simply sees more and more outlines of the shape as it grows larger and larger until the outline reaches the edges of the computer display. An example of a shape that is being displayed in this exercise is shown in FIG. 8.

It is observed that some of the shapes that are being shown in outline includes a circle, a square, a rectangle and an oval. However, any regular or irregular shape which draws the readers eyes outwards peripherally can be used.

Figure 9:
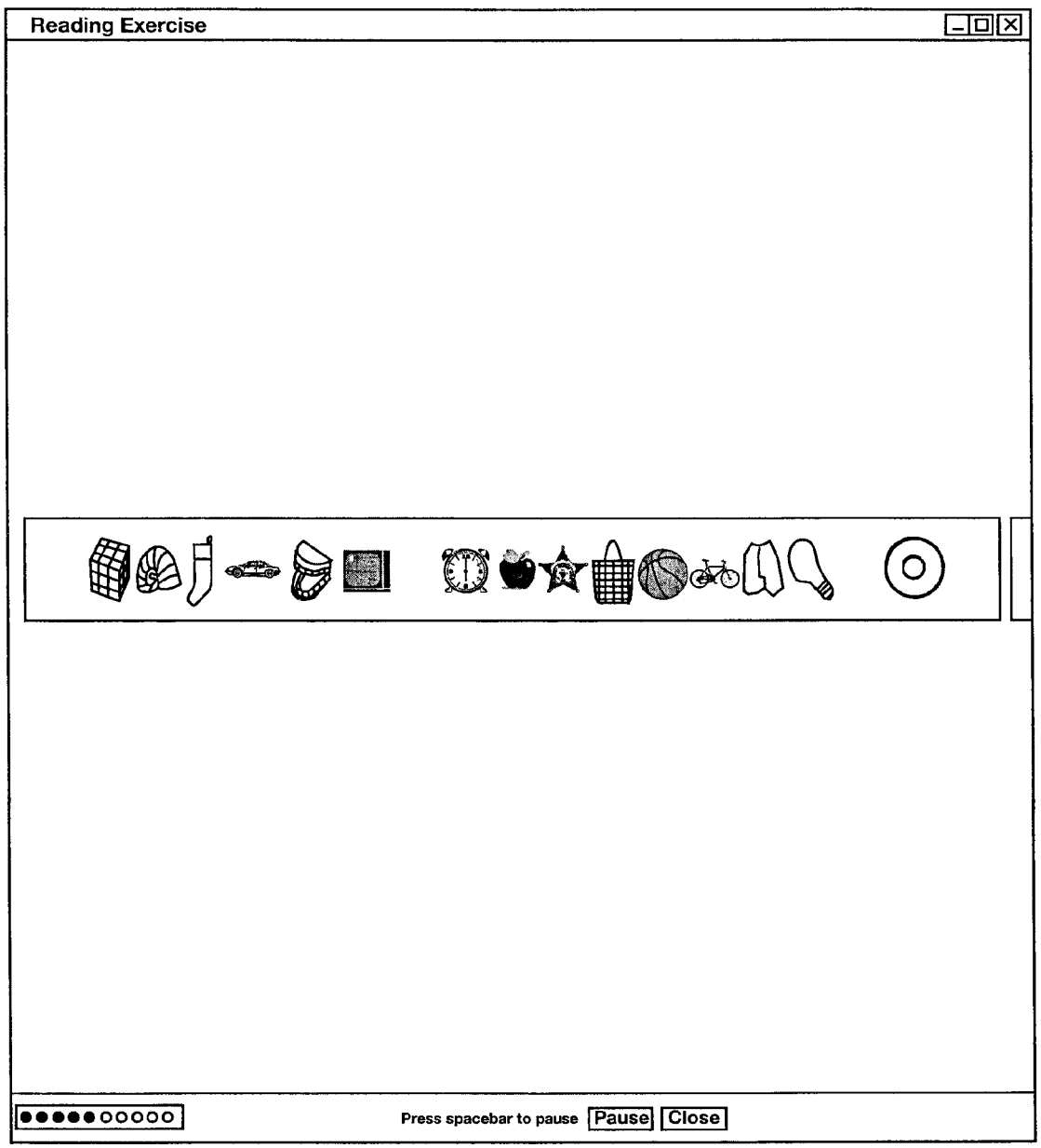
FIG. 9 is a screen shot that shows a plurality of objects that are caused to either rapidly appear or rapidly scroll across the computer display.

The sixth exercise instructs the reader to quickly scan a horizontal sequence of objects which are rapidly displayed as a single line on the computer screen, moving rapidly from the left side and proceeding until reaching the right side. For example, these object include such things as a light bulb, a lamp, a ball, a telephone, a globe, a helmet, gloves, etc. The graphical images are relatively small as shown in perspective relative to the size of the computer screen in FIG. 9. The reader is supposed to try and identify as many of the objects as possible before they disappear from the screen to be rapidly replaced by a next line of objects. It is observed that the rate at which the objects appear on the computer screen is changed in an advantageous manner.

Specifically, one of the novel features of the invention is the pace or rate at which words and objects are cause to appear. In the sixth exercise, the objects appear at a first rate, then after a few lines, the object begin to appear at a faster second rate. Finally, after a few lines, the objects appear at a third rate which is approximately halfway between the first rate and the second rate.

This sequence of a first rate, a faster second rate, followed by a third rate that is between the first and second rate is a critical training step of the brain. The reader is given a first and usually more comfortable first rate at which to look at an object or read text. Then the reader is pushed or caused to strain well beyond a present ability to read or comprehend. Then the reader is allowed to relax with the third rate. Advantageously, the third rate is faster than the first rate, and this third rate becomes a new baseline reading rate for the reader. The reader has been pushed to a new and faster reading rate, while generally maintaining a level of comprehension of material that is being read.

The seventh exercise instructs the reader to quickly look at a single line of text that will appear on the computer screen. The reader is to look near the center of the line of text, and try and comprehend the entire meaning of the line using peripheral vision to see the words that the reader is not looking at directly.

Similar to the sixth exercise, the rate at which the lines of text appear are at a first rate, then text is caused to appear at a faster second rate, and finally the text is caused to appear at a more comfortable third rate that is faster than the first rate and slower than the second rate. The reader has been caused to stretch in terms of both a reading rate and comprehension rate.

The eighth exercise instructs the reader to follow the movement of an object on the computer display by only moving the eyes, as in the first exercise. It is noted that the object is being moved in a pattern of a FIG. 8.

The ninth exercise is generally a repeat of the second exercise, where the outline of a shape expands outwards from the center of the computer screen, while erasing each shape before the next outline is drawn.

The tenth exercise is substantially similar to the sixth and seventh exercises. The other exercises focus on building eye-brain connections. The sixth, seventh and the tenth exercises force the mind to stretch its reading rate and comprehension rate. In the tenth exercise, this is accomplished by displaying lines of text which appear one at a time for the reader.

For example, a first line of text appears near the top of the computer screen. The line is erased and a next subsequent line of text then appears and disappears from the line below. This process repeats itself until reaching the bottom of the computer screen. The process then begins again at the top of the computer screen if the exercise is not finished. Like the sixth and seventh exercises, the tenth exercise also display lines of text in the same advantageous rate sequence.

It should now be apparent that the exact sequence of the exercises can be modified, or the number increased. However, the present number and type of exercises is sufficient to increase the reading and comprehension rates of many readers. However, the exercises themselves can be made more difficult and challenging to push the reader to increase performance.

For example, objects can be moved or expanded more rapidly in the first, second, third, fourth, fifth, eighth and ninth exercises. Or the length of the exercises can be extended. Similarly, the number of objects or the number of lines of objects can be increased in the sixth exercise. Furthermore, the first or base rate can be increased. Likewise, these same modifications can be made to the number of lines of text, and the rate at which lines appear in the seventh and tenth exercises.

Sessions gradually increase in speed and difficulty. If the reader is not comfortable with the rate of increase, the reader is encouraged to slow down a bit and repeat sessions as necessary. This is because everyone has a unique learning pace and style. Accordingly, the present invention was made adaptable, where the reader progresses from session to session at whatever rate is deemed comfortable. Progress will still be made, just at a slower rate.

Figure 10:
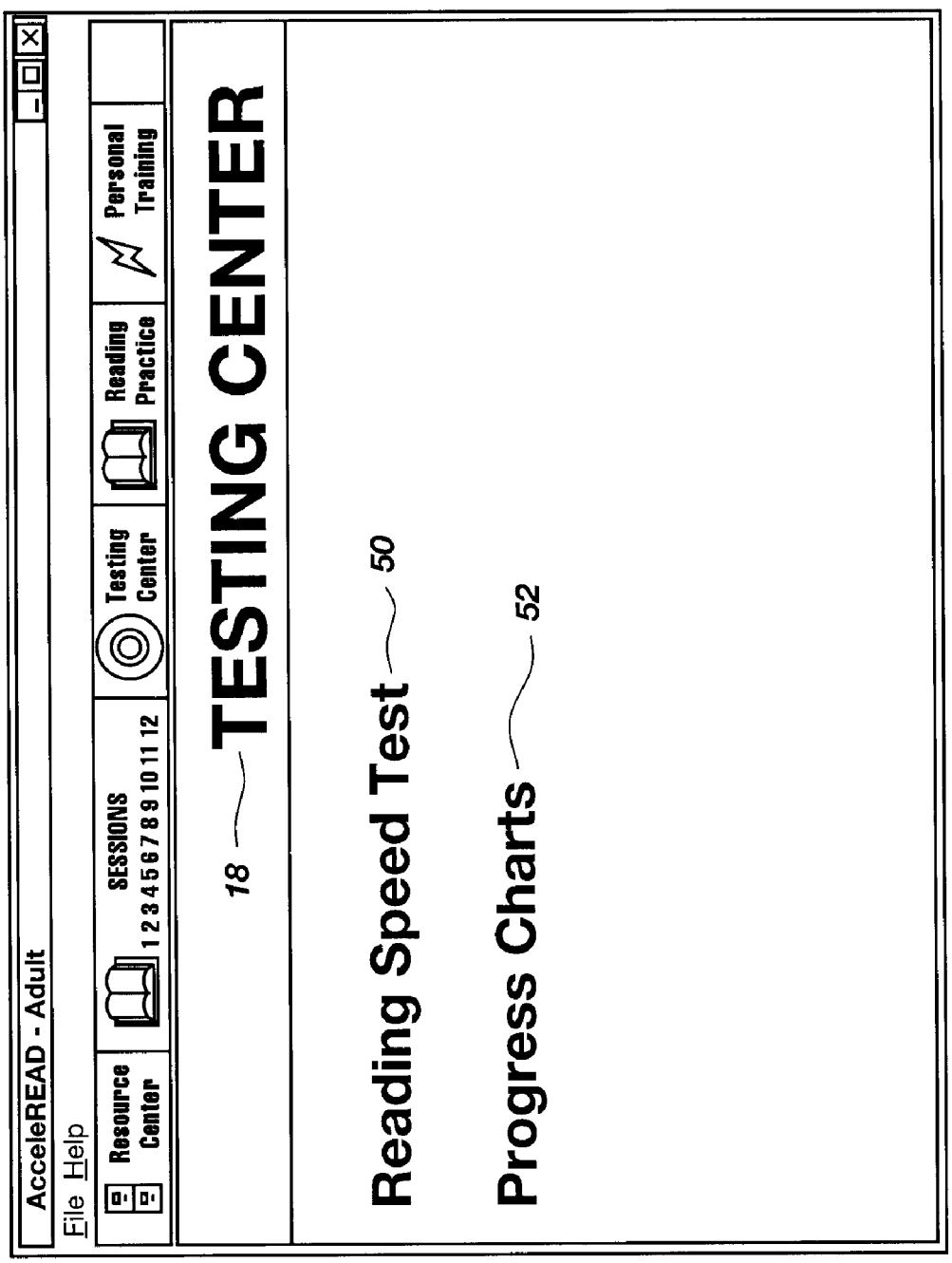
FIG. 10 is a screen shot that shows the screen that is displayed when the reader selects Testing Center 18 from the screen shown in FIG. 1.

The reader is also able to visit the Testing Center 18 at any time. FIG. 10 is a screen shot which illustrates the options given to the reader when it is selected. The Reading Speed Test 50 is exactly like a Pre or Post-Test that are given in the Sessions 16. The results of the Reading Speed Tests are also recorded by the program.

Figure 11:
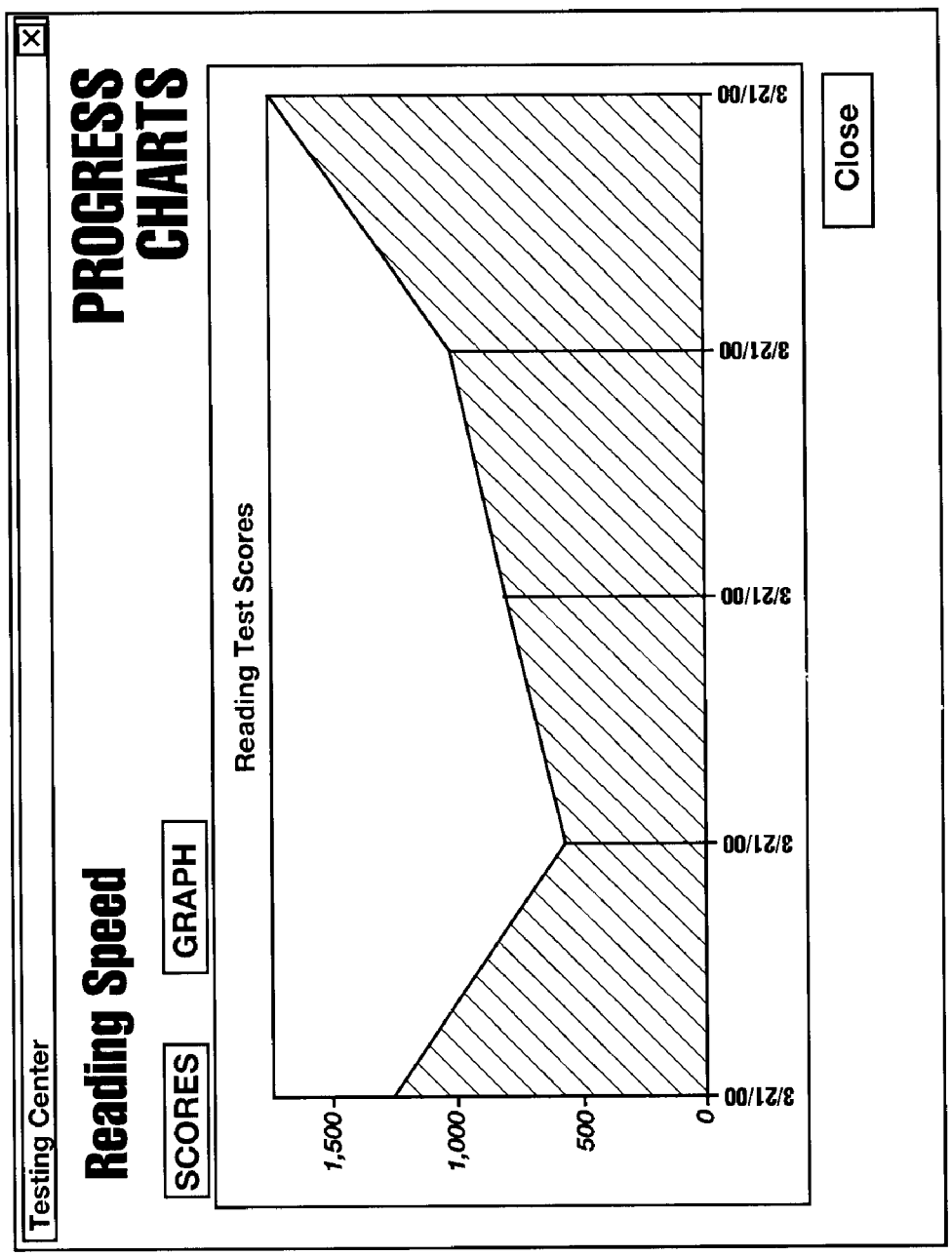
FIG. 11 is a screen shot of a graph that illustrates reading progress by providing a score associated with the date and time that each test was taken.

The results of the Pre-Tests, Post-Tests, and the Reading Speed Tests can all be viewed on a single graph by selecting the Progress Charts 52 option in the Testing Center 18. An example of such a graph is illustrated in FIG. 11. The graph shows the date and time that each test was taken.

Measuring progress through testing is an important aspect of the present invention. Testing provides positive reinforcement for the work that the reader is doing, and it is an objective indicator of the learning and strengthening of eye muscles that is taking place. After the reader has completed all twelve sessions, the reader should periodically test reading speed to ensure retention of the new speed reading skills.

Figure 12:
FIG. 12 is a screen shot that shows the screen that is displayed when the reader selects Reading Practice 20 from the screen shown in FIG. 1.

The reader is also able to choose Reading Practice 20 by selecting this option from the menu bar 12 at any time. FIG. 12 is a screen shot which illustrates a sample of the Reading Practice options given to the reader when it is selected. Reading material is selected from a list of popular and classic literary pieces.

The first step is to select the reading material from the column of titles 54. The cursor is moved over a box to make a section. The reader must then select whether to read at a pace set by the reader, or one set by the software program. If the reader lets the software program set the reading pace, the reader is able to select the column width (words per line), font size (size of words), block size (number of lines highlighted) and the speed (words per minute) at which the software will move. It is noted that an important and novel feature of the present invention is the ability to customize the features described above. This ability to customize enables the reader to maintain the maximum degree of comfort while still pushing the reader to new levels of reading speed and comprehension.

Finally, the reader is asked where to begin reading. If the reader has already read from a selection, the reader can either begin again at the beginning, or start from where the reader stopped reading last.

When the reader clicks on the Next button, a page of text is displayed as shown in FIG. 13. In the lower left hand corner is a button labeled Start Timer 56. The reader selects this button and then begins to read. The reader is instructed to press the spacebar when it is time to turn the page. When the reader is finished reading, the reader selects the button labeled Stop/BookMark 58 which replaced the Start Timer button 56. It is also noted that this feature of being able to bookmark the reading material is a significant benefit to the training process, enabling the reader to pick up where reading was previously halted by the reader, instead of having to begin all over again. In this way, the reader can take a break in order to avoid strain and fatigue, and begin anew without having to re-read the same training materials.

As with training sessions, the reader should pause and rest during a practice session if feeling fatigue or pain. It is recommended that the reader practice the speed-reading skills on a regular basis after completing all of the training sessions.

Figure 14:
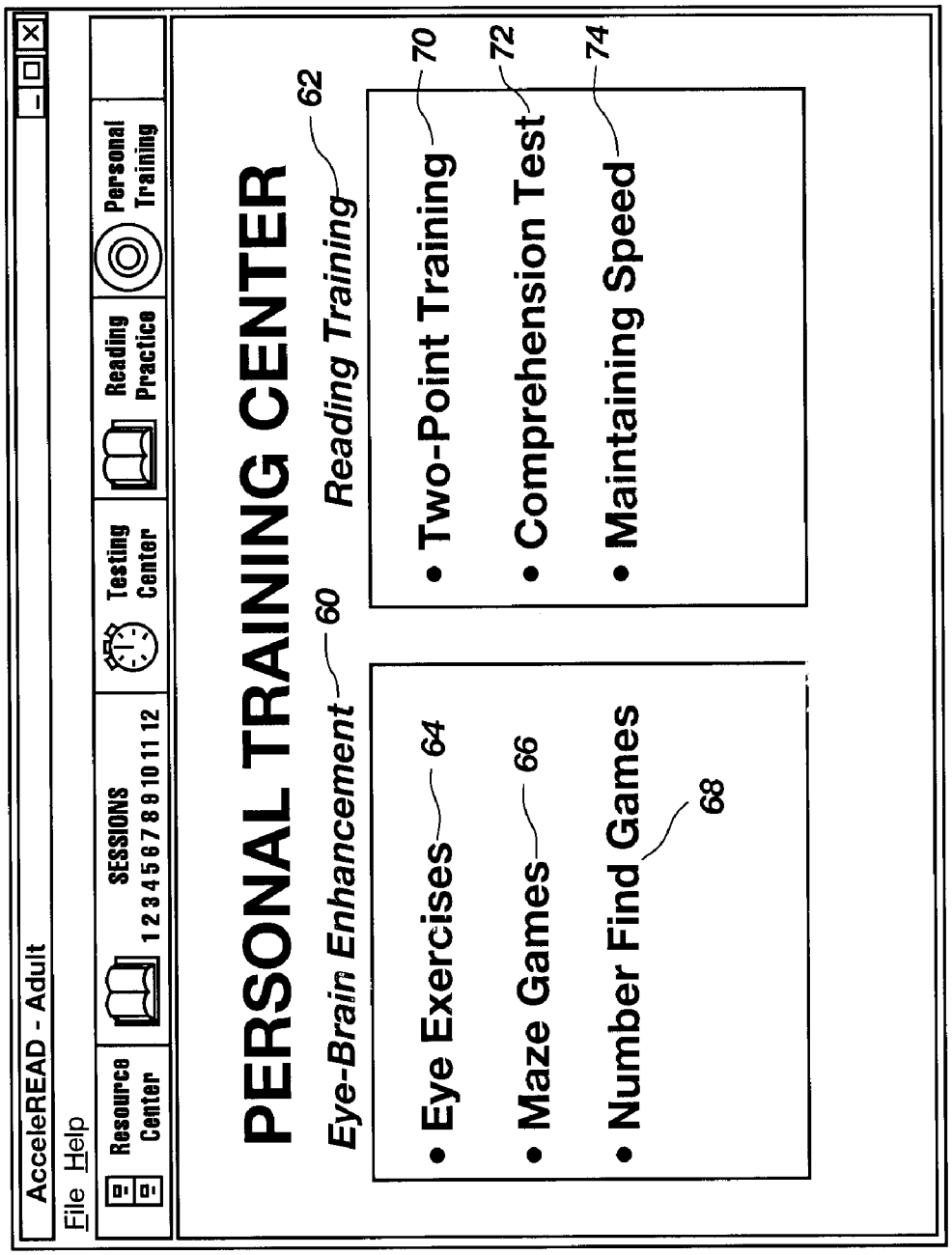
FIG. 14 is a screen shot that shows the screen that is displayed when the reader selects Personal Training 22 from the screen shown in FIG. 1.

The last selectable button on the menu bar 12 is for Personal Training 22. The Personal Training center 22 provides six types of exercises designed to develop the eye-brain connection, and thereby improve reading ability. These options are shown in FIG. 14. FIG. 14 shows that there are two columns of exercises. The first column is labeled Eye-Brain Enhancement 60, and the second column is labeled Reading Training 62. Eye-Brain Enhancement exercises include Eye Exercises 64, Maze Games 66, and Number Find Games 68. Reading Training 62 includes Two-Point Training 70, Comprehension Test 72, and Maintaining Speed 74.

It is observed that the Number Find Games 68, the Two-Point Training 70, and the Eye Exercises 64 described in this document are particularly unique exercises. These exercises bring a new ability to the present invention to train and teach the concepts of the preferred embodiment.

FIG. 15 is a screen shot of the computer screen that is displayed when the reader selects Eye Exercises 64. These exercises will strengthen all six sets of eye muscles and increase the reader's field of vision. Exercises with moving objects will allow the reader to practice following the objects with the eyes, without moving the head. Expanding circles and squares will strengthen peripheral vision by focusing the reader's vision in the center of the circles or squares and following the expanding edges with peripheral vision. The reader is able to select the length of the exercise session from 30, 60 or 90 seconds. Readers should begin with the 30 second session to avoid eye stress and fatigue.

FIG. 16 is a screen shot of the computer screen that is displayed when the reader selects Maze Games 66. Solving maze games accomplishes another important aspect of the present invention. This is because this activity activates the right hemisphere of the brain and strengthens the ability to scan images quickly. Test mazes appear randomly but are all at the same level of difficulty that is selected. Practice levels correspond with the increasing difficulty of the twelve training sessions. This section also includes a progress chart, based on time, that will track improvement of the reader. It is recommended that the reader select Test Your Speed to get used to the mazes.

Figure 17:
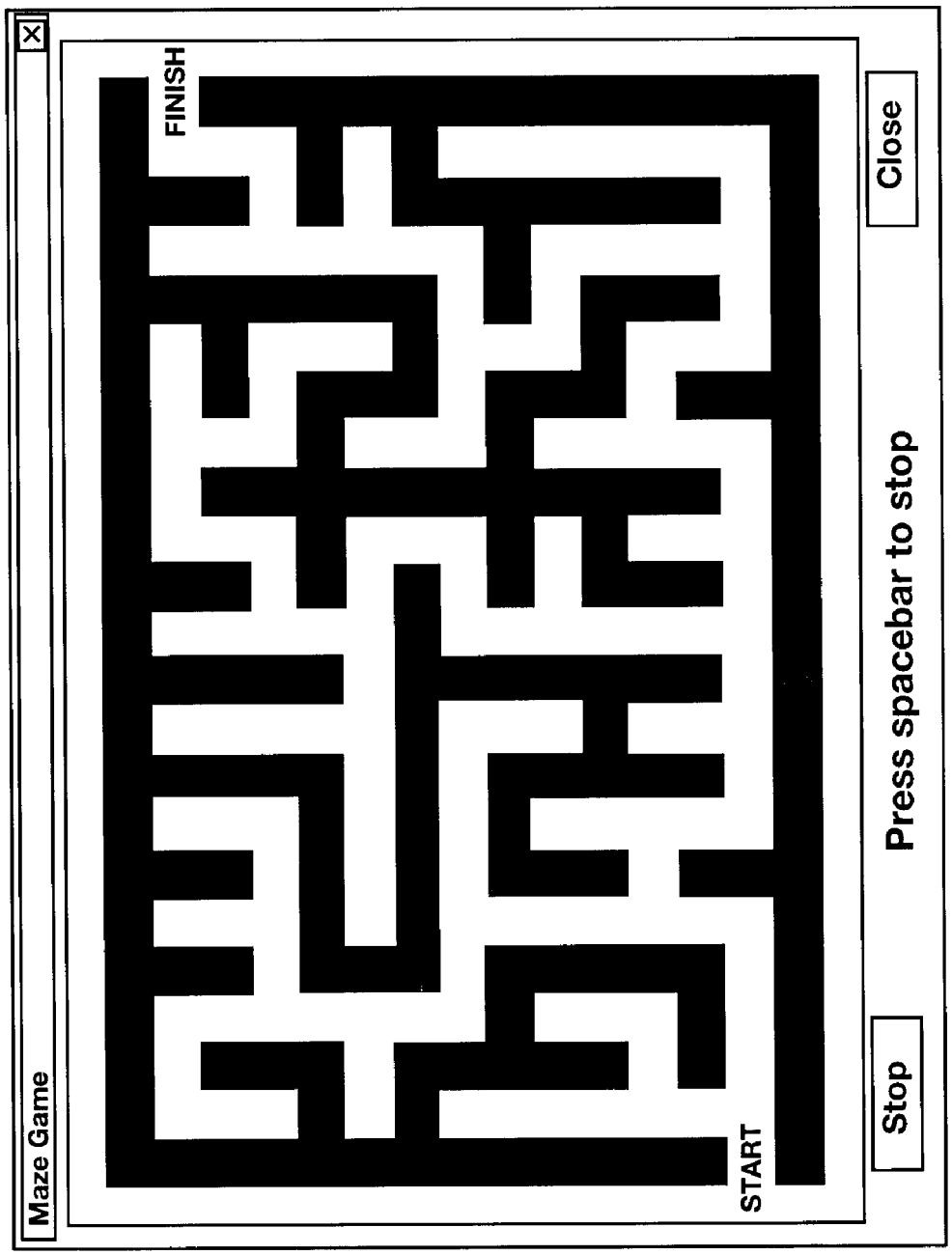
FIG. 17 is a screen shot of a maze.

FIG. 17 is a screen shot of a maze. The maze is labeled with a position to start and finish. Once the reader has traced the correct path, the spacebar is pressed to stop a timer.

Figure 18:
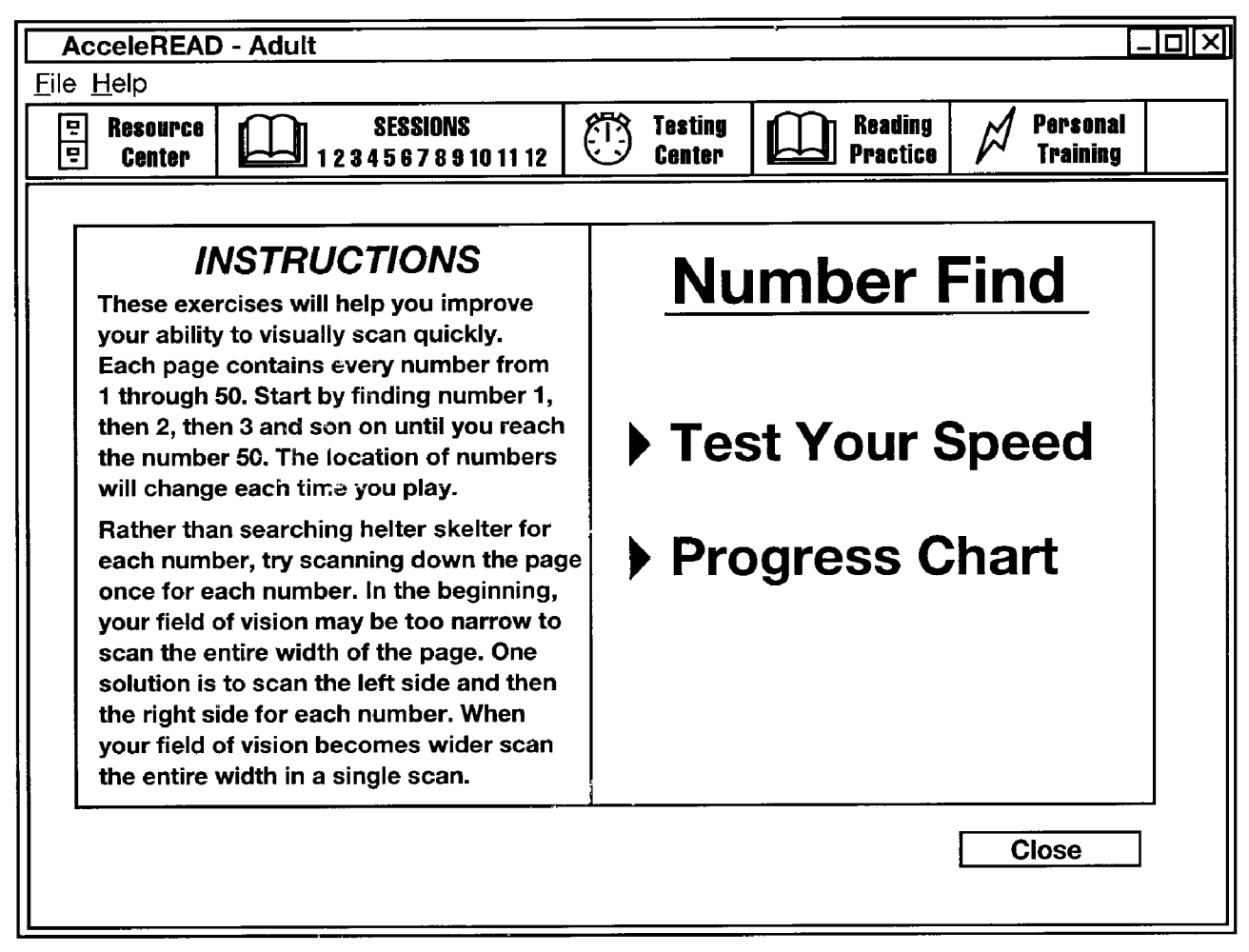

FIG. 18 is a screen shot of the computer screen that is displayed when the reader selects Number Find Games 68. The section includes the test area, and a progress chart. These exercises help the reader to improve the ability to visually scan quickly by looking for numbers in sequential order. Each page contains every number from 1 through 50. The location of the numbers will change each time the game is played. The time it takes the complete the game is recorded and shown in the progress chart. The game includes instructions teaching the reader how to scan most efficiently and how to broaden the field of vision. Those instruction include teaching the reader to scan the page once instead of searching in a random patterns for the next sequential number. At the beginning, the reader may have to scan more than once until the reader's field of vision widens.

One of the significant aspects of the number finding exercise is to teach the reader how to scan quickly for specific information. For example, the reader can be taught by this exercise how to quickly scan written material for specific names, dates, etc.

Figure 19:
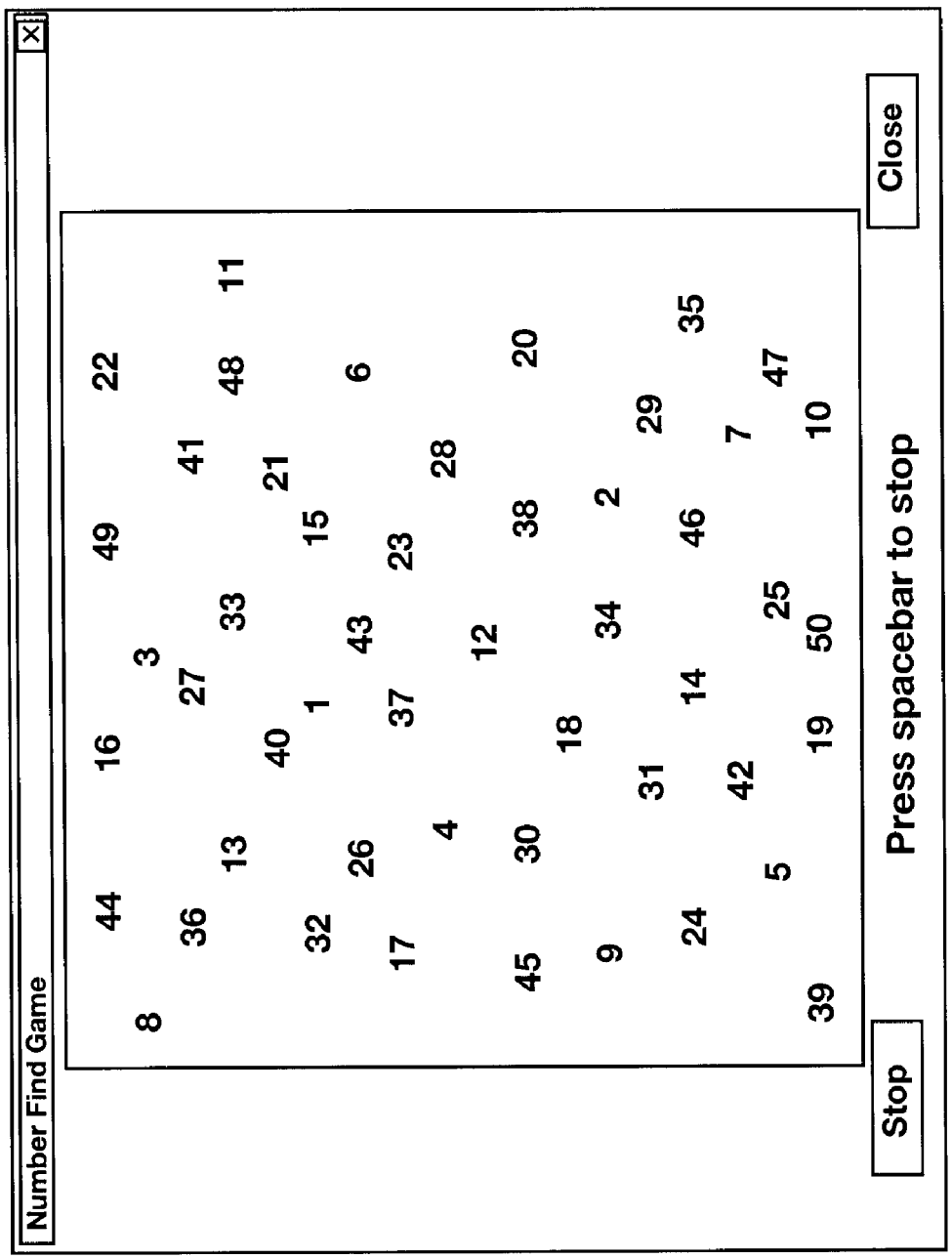
FIG. 19 is a screen shot of a number finding game.

FIG. 19 is a screen shot of the computer screen that is displayed when the reader begins a Number Find Game. Of course, the position of the numbers will change each time the game is accessed. The reader is instructed to press the spacebar once all the numbers have been sequentially located by the reader.

FIG. 20 is a screen shot of the computer screen that is displayed when the reader selects Two-Point Training 70. Testing experience of the inventors has shown that Two-Point training is a highly effective technique for increasing reading speed. The reader is cautioned that the exercise is strenuous, and therefore should not be repeated more often than every other day. In Two-Point training, each line begins and ends with a square. The reader is instructed to move the eyes as quickly as possible from the left square to the right square, working the way down the page. The reader is not supposed to read the words; only look at the squares. The goal of the exercise is to scan as many lines as possible in 10 seconds.

FIG. 21 is a screen shot of the computer screen that is displayed when the reader is participating in the training exercise. If the reader reaches between 1–10 lines, then the reader was probably reading the words instead of looking at the squares. If the reader reaches between 10–19 lines, then the reader was probably reading some of the words which slowed the reader down. If the reader reaches between 20–29 lines, then the reader followed instructions but concentrated too much on moving the eyes in straight lines and that slowed the reader down. If the reader reaches between 30–39 lines, then the reader's eye muscles are not yet strong enough or the reader would have finished. After the reader practices looking from square to square, then the reader is instructed to try reading the words at the same pace in order to continue pushing reading ability and comprehension. When a reacher reaches 40 lines in the allotted time period, the reader's eyes are strong enough to read approximately 2500 words per minute.

FIG. 22 is a screen shot of the computer screen that is displayed when the reader selects the Comprehension Test 72. The reader is asked to select one of three short pieces to read. Upon completion, the reader is given a short quiz regarding the content of the piece. Specifically, the reader is asked 10 questions. The test scores include information on reading speed as well as comprehension of the material read. Experience has shown that initially, a reader may find that comprehension may slightly diminish. However, upon reaching session 12, the reader should find that comprehension has improved.

Figure 23:
FIG. 23 is a screen shot that shows the screen that is displayed when the reader selects Maintaining Speed 74 from the screen shown in FIG. 14.

FIG. 23 is a screen shot of the computer screen that is displayed when the reader selects Maintaining Speed 74. The eye exercises and the two-point training of the present invention not only strengthen the eye muscles, but also create a processing pattern in the brain. Accordingly, this training provides an opportunity to conduct eye warm-up exercises, do two-point horizontal training, and do two-point vertical training. The reader is instructed to regularly return to practice these exercises in order to help activate the eye-brain connection and maintain reading speed.

The AcceleREAD software program also contains a screen saver which enables a reader to regularly access some exercises. The screen saver is a 30 second eye exercise. It is believed that by constantly keeping eye and reading exercises in the daily routine of a reader, the reader can maintain a high reading and comprehension rate.

It is noted that a server version of the ACCELEREAD program has been developed which multiplies a reading comprehension percentage rate by the reading score of raw words per minute. This score provides what is referred to as a True Reading Speed. For example, if a reader is presently reading 1000 words per minute, and has a comprehension score of 80%, then the True Reading Speed is calculated to be 800 words per minute.

Finally, mini-exercises are also available for maintenance of the speed reading skills that enhance eye-brain connectivity and strengthen eye muscles. The mini-exercises can be activated at any time by selecting an icon that is disposed at the bottom right hand corner of the computer display. Selecting the icon activates a session of the mini-exercises which can be terminated at any time.

An important feature of the present invention is that some exercises are available to the reader without the recording medium from which the program is installed, to be loaded in the computer. For example, the reader must have the recording medium, such as a CD-ROM disk, loaded in a CD-ROM or DVD drive tray of the computer in order to do the exercises. However, the mini-exercises described above do not require this. Advantageously, the mini-exercises are thus quickly and easily accessible.

It is observed that the combination of exercises, training, and testing provided by the present invention are made possible because they have been implemented in a computer software program. In other words, it is not possible to do these exact same activities without a computer system. Accordingly, a computer system is an integral component of the invention.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for utilizing a computer software program in order to increase reading speed and improve comprehension of a reader by pushing the reader to read beyond a current capability, and then easing back to a more comfortable reading rate that is faster than an original reading rate, the method comprising the steps of:
   (1) displaying text and having the reader read the text at a first speed for a first period of time;
   (2) displaying text and having the reader read the text at a second speed for a second period of time, wherein the second speed is faster than the first speed; and
   (3) displaying text and having the reader read the text at a third speed for a third period of time, wherein the third speed is faster than the first speed and slower than the second speed.

2. The method as defined in claim 1 wherein the method further comprises the step of displaying the text from a left side of the computer screen to a right side of the computer screen.

3. The method as defined in claim 1 wherein the method further comprises the step of generating a ticking sound from a computer system, wherein the ticking sound is synchronized with displaying each letter of the text as the text is displayed.

4. The method as defined in claim 1 wherein the method further comprises the steps of:
   (1) recording the third speed at which the reader finished a previous reading exercise; and
   (2) setting the first speed equal to the recorded third speed when beginning a new reading exercise, such that the reader is gradually increasing a reading speed.

5. The method as defined in claim 1 wherein the method further comprises the steps of:
   (1) displaying the text by typing each individual letter of words in the text until an entire line of text is displayed;
   (2) erasing the line of text;
   (3) displaying a next line of text by typing each individual letter of words in the text until the next entire line of text is displayed; and
   (4) repeating these steps for a predetermined period of time.

6. The method as defined in claim 1 wherein the method further comprises the steps of:
   (1) displaying the text by groups of words until an entire line of text is displayed;
   (2) erasing the line of text;
   (3) displaying a next line of text by displaying groups of words until the entire next line of text is displayed; and
   (4) repeating these steps for a predetermined period of time.

7. The method as defined in claim 1 wherein the method further comprises the steps of:
   (1) displaying the text by displaying at least two complete lines of text;
   (2) erasing the at least two complete lines of text;
   (3) displaying more text by displaying at least two different complete lines of text; and
   (4) repeating these steps for a predetermined period of time.

8. The method as defined in claim 1 wherein the method further comprises the steps of:
   (1) stimulating both hemispheres of the brain so as to include both hemispheres in a reading process of the reader;
   (2) strengthening eye muscles; and
   (3) expanding a field of vision of the reader so as to peripherally visualize more text at any given time.

9. The method as defined in claim 8 wherein the method for stimulating both hemispheres of the brain further comprises the steps of:
   (1) generating a maze having a start point and end point;
   (2) displaying the maze on the computer display and activating a timer;
   (3) causing the reader to visually scan the maze from the start point until reaching the end point; and
   (4) deactivating the timer when the reader has visually completed scanning the maze.

10. The method as defined in claim 8 wherein the method for stimulating both hemispheres of the brain further comprises the steps of:
    (1) randomly displaying a sequential set of numbers on the computer screen and activating a timer;
    (2) causing the reader to visually scan the computer screen and sequentially identifying a location of each of the set of numbers in sequential order; and
    (3) deactivating the timer when the reader has visually completed sequentially scanning the computer screen for the sequential set of numbers.

11. The method as defined in claim 10 wherein the method further comprises the step of defining the sequential set of numbers as the numbers 1 through 50.

12. The method as defined in claim 8 wherein the method for expanding peripheral vision of the reader further comprises the steps of:
    (1) displaying a first outline of a shape in approximately a center of a computer screen for a first period of time;
    (2) erasing the first outline of the shape;
    (3) displaying a second outline of the shape for a second period of time, wherein the second outline is centered around the first outline, and wherein edges of the second outline are expanded relative to the first outline; and
    (4) erasing and then displaying a new outline of the shape, centered around an immediately previous outline, until the edges of the shape reach a perimeter of the computer screen.

13. The method as defined in claim 8 wherein the method for expanding peripheral vision of the reader further comprises the steps of:
 (1) displaying a first outline of a shape in approximately a center of a computer screen for a first period of time;
 (2) displaying a second outline of the shape for a second period of time, wherein the second outline is centered around the first outline, and wherein edges of the second outline are expanded outward relative to the first outline; and
 (3) displaying a new outline of the shape, centered around an immediately previous outline, until the edges of the shape reach a perimeter of the computer screen.

14. The method as defined in claim 8 wherein the method for strengthening eye muscles further comprises the steps of:
 (1) displaying an object on the computer screen at predetermined locations; and
 (2) causing the reader to look at and follow the object by moving the eyes as it is displayed on the computer screen.

15. The method as defined in claim 14 wherein the method further comprises the steps of:
 (1) displaying the object on opposite sides of the computer screen, beginning at an upper corner of the display; and
 (2) moving the object down the display to thereby cause the reader's eyes to scan back and forth in a horizontal motion.

16. The method as defined in claim 14 wherein the method further comprises the steps of:
 (1) displaying the object on opposite sides of the computer screen, beginning at a top corner or bottom corner of the display; and
 (2) moving the object from a bottom or top edge to an opposite side of the display to thereby cause the reader's eyes to scan up and down in a vertical motion as the object moves across the display.

17. The method as defined in claim 14 wherein the method further comprises the steps of:
 (1) displaying an object generally near a center of the computer display; and
 (2) subsequently erasing and then displaying the object while moving the object progressively outwards in a consistent diagonal orientation.

18. The method as defined in claim 8 wherein the method for strengthening eye muscles further comprises the steps of:
 (1) displaying a plurality of lines of text on the computer screen;
 (2) disposing a symbol at a beginning and at and end of each of the plurality of lines of text;
 (3) causing the reader to scan the lines of text without reading the text, beginning at a symbol at the beginning of the first line of the plurality of lines and moving the eyes of the reader to a symbol at the end of the first line of the plurality of lines;
 (4) proceeding down each line of text, scanning from the symbol at the beginning of each line of text and moving immediately to the symbol at the corresponding line of text;
 (5) scanning as many of the symbols as possible within a predetermined amount of time; and
 (6) grading performance of the exercise based upon the number of lines that the reader was able to scan, without reading the words.

19. The method as defined in claim 1 wherein the method further comprises the steps of:
 (1) customizing a column width of the text so as to set a total number of words per line that will appear;
 (2) customizing a font size of the text so as to set a size of words in the text;
 (3) customizing a block size so as to set a number of lines of the text to be highlighted at any one time; and
 (4) customizing a speed of the text so as to set a rate of words per minute that the reader sees.

20. A method for utilizing a computer software program in order to increase reading speed and improve comprehension of a reader, the method comprising the steps of:
 (1) causing the reader to read at a first reading rate, then to read beyond a current capability, and then easing back to a more comfortable reading rate that is faster than the original reading rate;
 (2) stimulating both hemispheres of the brain so as to include both hemispheres in a reading process of the reader;
 (3) strengthening eye muscles; and
 (4) expanding a field of vision of the reader so as to peripherally visualize more text at any given time.

21. The method as defined in claim 20 wherein the method further comprises the steps of:
 (1) providing the computer software program with a main menu from which the reader can select to receive a practice session, test reading rate and comprehension, participate in speed reading practice exercises, or receive personal training to enhance an eye-brain connection or receive speed reading training; and
 (2) selecting one of the options on the main menu.

22. The method as defined in claim 21 wherein the step of selecting the practice session further comprises the steps of:
 (1) selecting one of twelve sessions in which to participate;
 (2) taking a Pre-Test which determines a pre-practice session reading rate;
 (3) participating in a practice session; and
 (4) taking a Post-Test which determines a post practice session reading rate.

23. The method as defined in claim 22 wherein the step of participating in a practice session further comprises the steps of:
 (1) participating in at least one eye strengthening exercise;
 (2) participating in at least one eye exercise which is designed to expand peripheral vision of the reader;
 (3) participating in at least one exercise which is designed to stimulate both hemispheres of the brain to participate in a reading process;
 (4) participating in at least one exercise which is designed to improve reading comprehension; and
 (5) participating in at least one exercise which pushes the reader to read beyond a current reading rate.

24. The method as defined in claim 23 wherein the step of participating at least one exercise which pushes the reader to read beyond a current reading rate further comprises the steps of:
 (1) displaying text and having the reader read the text at a first speed for a first period of time;
 (2) displaying text and having the reader read the text at a second speed for a second period of time, wherein the second speed is faster than the first speed; and (3) displaying text and having the reader read the text at a third speed for a third period of time, wherein the third speed is faster than the first speed and slower than the second speed.

25. The method as defined in claim 23 wherein the step of participating in at least one exercise which is designed to stimulate both hemispheres of the brain to participate in a reading process further comprises the steps of:

(1) generating a maze having a start point and end point;

(2) displaying the maze on the computer display and activating a timer;

(3) causing the reader to visually scan the maze from the start point until reaching the end point; and (4) deactivating the timer when the reader has visually completed scanning the maze.

26. The method as defined in claim 23 wherein the step of participating in at least one exercise which is designed to stimulate both hemispheres of the brain to participate in a reading process further comprises the steps of:

(1) randomly displaying a sequential set of numbers on the computer screen and activating a timer;

(2) causing the reader to visually scan the computer screen and sequentially identifying a location of each of the set of numbers in sequential order; and (3) deactivating the timer when the reader has visually completed sequentially scanning the computer screen for the sequential set of numbers.

27. The method as defined in claim 23 wherein the step of participating in at least one eye exercise which is designed to expand peripheral vision of the reader further comprises the steps of:

(1) displaying a first outline of a shape in approximately a center of a computer screen for a first period of time;

(2) displaying a second outline of the shape for a second period of time, wherein the second outline is centered around the first outline, and wherein edges of the second outline are expanded outward relative to the first outline; and (3) displaying a new outline of the shape, centered around an immediately previous outline, until the edges of the shape reach a perimeter of the computer screen.

28. The method as defined in claim 23 wherein the step of participating in at least one eye strengthening exercise further comprises the steps of:

(1) displaying a plurality of lines of text on the computer screen;

(2) disposing a symbol at a beginning and at and end of each of the plurality of lines of text;

(3) causing the reader to scan the lines of text without reading the text, beginning at a symbol at the beginning of the first line of the plurality of lines and moving the eyes of the reader to a symbol at the end of the first line of the plurality of lines;

(4) proceeding down each line of text, scanning from the symbol at the beginning of each line of text and moving immediately to the symbol at the end of the corresponding line of text;

(5) scanning as many of the symbols as possible within a predetermined amount of time; and (6) grading performance of the exercise based upon the number of lines that the reader was able to scan, without reading the words.

29. The method as defined in claim 28 wherein the method further comprises the step of reading the words on each line of text as the reader scans down the plurality of lines.

30. The method as defined in claim 20 wherein the method further comprises the steps of:

(1) providing a first icon on a computer display which enables the reader to access eye exercises which can be performed without the need for a recording medium from which the computer software program was installed, to be present in the computer; and (2) providing a second icon on a computer display which enables the reader to access reading exercises which can be performed without the need for the recording medium from which the computer software program was installed, to be present in the computer.

* * * * *